US012626906B2

(12) United States Patent (10) Patent No.: US 12,626,906 B2

Saimen (45) Date of Patent: May 12, 2026

(54) POSITIVE ELECTRODE AND ELECTRICITY STORAGE DEVICE

(71) Applicant: HONDA MOTOR CO., LTD., Tokyo (JP)

(72) Inventor: Kazuki Saimen, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 617 days.

(21) Appl. No.: 17/666,574

(22) Filed: Feb. 8, 2022

(65) Prior Publication Data

US 2022/0263067 A1 Aug. 18, 2022

(30) Foreign Application Priority Data

Feb. 12, 2021 (JP) ................................ 2021-020633

(51) Int. Cl.
H01M 4/36 (2006.01)
H01M 10/0525 (2010.01)
*H01M 4/02* (2006.01)

(52) U.S. Cl.
CPC ....... H01M 4/364 (2013.01); H01M 10/0525 (2013.01); *H01M 2004/028* (2013.01)

(58) Field of Classification Search
CPC ............. H01M 4/364; H01M 10/0525; H01M 2004/028
See application file for complete search history.

(56) References Cited

U.S. PATENT DOCUMENTS

2013/0040202 A1 2/2013 Katusic et al.
2018/0076434 A1* 3/2018 Murakami .......... H01M 50/491

2018/0219212 A1* 8/2018 Seol ...................... H01M 4/364
2019/0020034 A1 1/2019 Umetsu et al.
2019/0181448 A1* 6/2019 Horikawa ............. H01M 4/366
2019/0296390 A1 9/2019 Yoshima et al.
2020/0243849 A1* 7/2020 Horikawa ............. H01M 4/485
2023/0059278 A1 2/2023 Asaka et al.

FOREIGN PATENT DOCUMENTS

| CN | 107925056 | A | 4/2018 |
| CN | 108475825 | A | 8/2018 |
| JP | 2012209161 | A | 10/2012 |
| JP | 2013531602 | A | 8/2013 |
| JP | 2016119180 | A | 6/2016 |
| JP | 2018029073 | A | 2/2018 |
| JP | 2019169252 | A | 10/2019 |
| WO | 2021153399 | A1 | 8/2021 |

OTHER PUBLICATIONS

Notification of Reasons for Refusal issued Sep. 24, 2024 in the JP Patent Application No. 2021-020633.
Office Action issued Oct. 19, 2024 in the CN Patent Application No. 202111486145.3.

* cited by examiner

*Primary Examiner* — Osei K Amponsah
(74) *Attorney, Agent, or Firm* — CKC & Partners Co., LLC

(57) ABSTRACT

Provided is a positive electrode including: a positive electrode current collector; and a positive electrode material mixture layer, the positive electrode material mixture layer including a positive electrode active material and dielectric particles, the positive electrode having a peak pore diameter smaller than or equal to the median diameter of the dielectric particles. Also provided is an electricity storage device including: the positive electrode; a negative electrode; and an electrolytic solution.

5 Claims, 2 Drawing Sheets

FIG. 1

—— Example 1    — — Examples 2, 4, 5, and 6    —··— Example 3

···· Comparative Example 2    ···· Comparative Example 3

POSITIVE ELECTRODE AND ELECTRICITY STORAGE DEVICE

This application is based on and claims the benefit of priority from Japanese Patent Application 2021-020633, filed on 12 Feb. 2021, the content of which is incorporated herein by reference.

BACKGROUND OF THE INVENTION

Field of the Invention

The present invention relates to a positive electrode and an electricity storage device.

Related Art

In the conventional art, lithium-ion secondary batteries are in widespread use as high-energy-density, electricity-storage devices. A typical lithium-ion secondary battery includes a positive electrode, a negative electrode, a separator provided between the electrodes, and an electrolytic solution with which the separator is impregnated. The positive electrode includes, for example, a positive electrode current collector and a positive electrode material mixture layer on the current collector.

Patent Document 1 discloses a process that includes impregnating a positive electrode material mixture layer on a positive electrode current collection with a dispersion of dielectric particles having a relative permittivity of 500 or more and particle sizes of 200 nm or less so that the dielectric particles are placed inside the positive electrode material mixture layer.

Patent Document 1: Japanese Unexamined Patent Application, Publication No. 2016-119180

SUMMARY OF THE INVENTION

Unfortunately, dielectric particles with particle sizes of 200 nm or less tend to aggregate, and the aggregation will cause a reduction in the rate of contact between the dielectric particles and an electrolytic solution if the dielectric particles are used in a large amount. As a result, even when the electric field generated inside the lithium-ion secondary battery acts on the dielectric particles, the dielectric polarization of the dielectric particles will be insufficiently effective in increasing the dissociation degree of the supporting salt in the electrolytic solution, which will cause the problem of an increase in cell resistance. Moreover, the dielectric particles will be insufficiently effective in trapping a small amount of an acid in the electrolytic solution and in interacting with and stabilizing the electrolytic solution, which may make it impossible to prevent the corrosion of the positive electrode active material or the decomposition of the electrolytic solution and lead to a reduction in the durability of the lithium-ion secondary battery.

It is an object of the present invention to provide a positive electrode with which an electricity storage device can be produced having lower cell resistance and having higher durability.

An aspect of the present invention relates to a positive electrode including: a positive electrode current collector; and a positive electrode material mixture layer, the positive electrode material mixture layer including a positive electrode active material and dielectric particles, the positive electrode having a peak pore diameter smaller than or equal to the median diameter of the dielectric particles.

The positive electrode material mixture layer may contain 0.1% by mass or more and 2% by mass or less of the dielectric particles.

The dielectric particles may have a relative permittivity of 20 or more.

The positive electrode may have a peak pore diameter of 0.1 μm or more and 0.6 μm or less.

The positive electrode may have a density of 3.4 g/cc or more.

The positive electrode active material may have a bimodal particle size distribution.

Another aspect of the present invention relates to an electricity storage device including: the positive electrode defined above; a negative electrode; and an electrolytic solution.

The present invention makes it possible to provide a positive electrode with which an electricity storage device can be produced having lower cell resistance and having higher durability.

BRIEF DESCRIPTION OF THE DRAWINGS

FIG. 1 is a graph showing the results of measurement of the pore diameter distributions of electrodes obtained in Examples 1 to 5 and Comparative Examples 1 to 3;

DETAILED DESCRIPTION OF THE INVENTION

Figure 2:
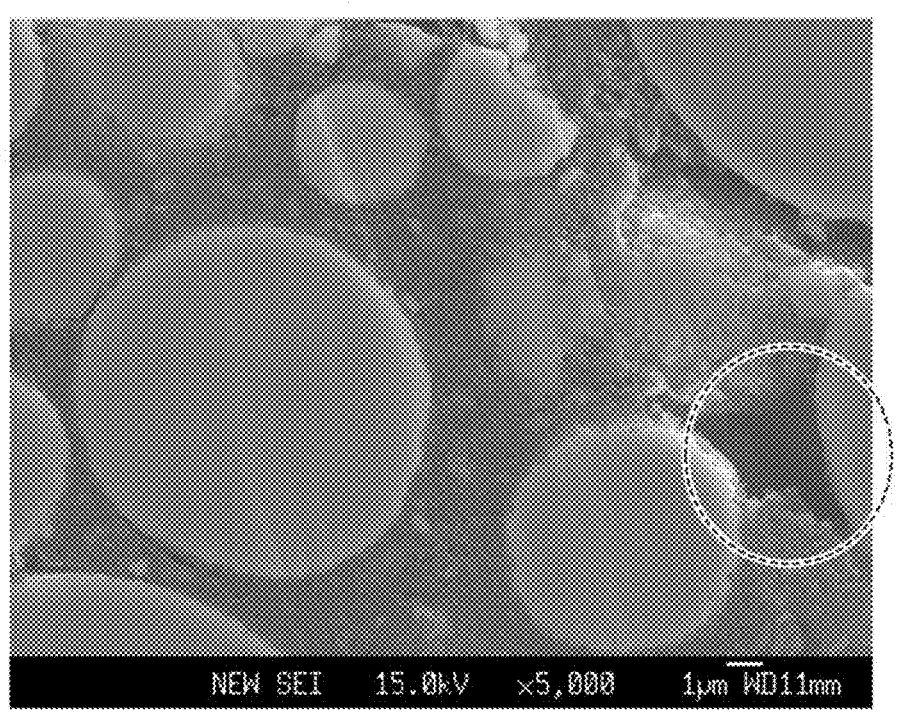
FIG. 2 is a scanning electron microscope (SEM) photograph of a cross-section of the positive electrode of Example 1.

Hereinafter, embodiments of the present invention will be described.

Positive Electrode

A positive electrode according to an embodiment of the present invention includes a positive electrode current collector and a positive electrode material mixture layer, in which the positive electrode material mixture layer includes a positive electrode active material and dielectric particles. The positive electrode according to the embodiment has a peak pore diameter smaller than or equal to the median diameter of the dielectric particles.

In an embodiment of the present invention, the positive electrode may have the positive electrode material mixture layer on one side of the positive electrode current collector or on each side of the positive electrode current collector.

The positive electrode according to the embodiment have a peak pore diameter smaller than or equal to the median diameter of the dielectric particles. Therefore, the positive electrode material mixture layer has a relatively small number of pores with diameters larger than the median diameter of the dielectric particles and thus provides a relatively high rate of contact between the dielectric particles and an electrolytic solution. Therefore, when the electric field generated inside an electricity storage device including the positive electrode acts on the dielectric particles, the dielectric polarization of the dielectric particles can increase the dissociation degree of the supporting salt in the electrolytic solution and reduce the cell resistance of the electricity storage device. The dielectric particles are also effective in trapping a small amount of an acid in the electrolytic solution and in interacting with and thus stabilizing the electrolytic solution. This effect makes it possible to prevent the corrosion of the positive electrode active material and the decomposition of the electrolytic solution and consequently to increase the durability of the electricity storage device.

The dielectric particles preferably have high relative permittivity in order to provide an electricity storage device having low cell resistance and having high durability.

The positive electrode according to the embodiment preferably has a peak pore diameter of 0.1 μm or more and 0.6 μm or less, more preferably 0.3 μm or more and 0.6 μm or less. When produced with the positive electrode according to the embodiment having a peak pore diameter of 0.1 μm or more and 0.6 μm or less, an electricity storage device can have low cell resistance and high durability.

The peak pore diameter of the positive electrode according to the embodiment may be controlled by adjusting the median diameter of the positive electrode active material or pressing the positive electrode in the process of producing it.

The positive electrode according to the embodiment preferably has a density of 3.4 g/cc or more, more preferably 3.5 g/cc or more. When produced with the positive electrode according to the embodiment having a density of 3.4 g/cc or more, an electricity storage device can have high cell energy density. In that case, the dielectric particles can also more effectively act on the electrolytic solution to increase the durability of the electricity storage device.

Dielectric Particles

The dielectric particles may be oxide particles.

The oxide constituting the oxide particles may be, for example, $BaTi_{1-x}Zr_xO_3$ (0≤x≤0.5), $SrBi_2Ta_2O_9$, $(K_{1-x}Na_x)NbO_3$ (0≤x≤1), $BiFeO_3$, $CaCu_3Ti_4O_{12}$, $Li_{0.33}La_{0.55}TiO_3$, $Li_{1.3}Al_{0.3}Ti_{1.7}P_3O_{12}$, or $LiNbO_3$.

The dielectric particles preferably have a relative permittivity of 20 or more, more preferably 30 or more. When produced with the dielectric particles having a relative permittivity of 20 or more, an electricity storage device can have low cell resistance and high durability.

The dielectric particles preferably have a median diameter of 0.3 μm or more and 1.0 μm or less, more preferably 0.4 μm or more and 0.6 μm or less. The dielectric particles having a median diameter of 0.3 μm or more and 1.0 μm or less are less likely to aggregate together and provide a large area of contact with an electrolytic solution.

The content of the dielectric particles in the positive electrode material mixture layer is preferably 0.1% by mass or more and 2% by mass or less, more preferably 0.5% by mass or more and 1.0% by mass or less. When the content of the dielectric particles in the positive electrode material mixture layer is 0.1% by mass or more, an electricity storage device produced with the positive electrode can have low cell resistance and high durability. When the content of the dielectric particles in the positive electrode material mixture layer is 2% by mass or less, an electricity storage device produced with the positive electrode can have high energy density.

Positive Electrode Material Mixture Layer

The positive electrode material mixture layer includes a positive electrode active material and the dielectric particles, and an optional component.

Examples of the optional component include a solid electrolyte, a conductive aid, and a binder.

The positive electrode active material may be any appropriate material capable of storing and releasing lithium ions. Examples of the positive electrode active material include, but are not limited to, $LiCoO_2$, $Li(Ni_{5/10}Co_{2/10}Mn_{3/10})O_2$, $Li(Ni_{6/10}Co_{2/10}Mn_{2/10})O_2$, $Li(Ni_{8/10}Co_{1/10}Mn_{1/10})O_2$, $Li(Ni_{0.8}Co_{0.15}Al_{0.05})O_2$, $Li(Ni_{1/6}Co_{4/6}Mn_{1/6})O_2$, $Li(Ni_{1/3}Co_{1/3}Mn_{1/3})O_2$, $LiCoO_4$, $LiMn_2O_4$, $LiNiO_2$, $LiFePO_4$, lithium sulfide, and sulfur.

The positive electrode active material may have a bimodal particle size distribution. In such a case, the positive electrode active material can be packed at high density, which allows the positive electrode according to the embodiment to have a narrow pore diameter distribution.

The positive electrode active material having a bimodal particle size distribution may be produced by, for example, mixing positive electrode materials having different particle size distribution peaks.

Positive Electrode Current Collector

The positive electrode current collector is typically, but not limited to, a metal foil or the like.

The metal foil may be made of aluminum or any other appropriate metal.

Method for Producing Positive Electrode

The positive electrode according to the embodiment may be produced using any method common in the field of the art, which may include, for example, applying, onto a positive electrode current collector, a paste that is for forming a positive electrode material mixture layer and includes the positive electrode active material and the dielectric particles; and then drying the paste.

The formation of the positive electrode material mixture layer on the positive electrode current collector may be followed by a process common in the field of the art. For example, the positive electrode current collector provided with the positive electrode material mixture layer is subjected to pressing to give a positive electrode. The pressing can adjust the density of the positive electrode.

Electricity Storage Device

An electricity storage device according to an embodiment of the present invention includes the positive electrode according to the embodiment, a negative electrode, and an electrolytic solution.

The electricity storage device is, for example, a secondary battery, such as a lithium-ion secondary battery, or a capacitor.

The negative electrode may be any known negative electrode available for electricity storage devices.

The electrolytic solution may be any known electrolytic solution available for electricity storage devices.

Lithium-Ion Secondary Battery

A lithium-ion secondary battery according to an embodiment of the present invention includes the positive electrode according to the embodiment, a negative electrode, an electrolytic solution, and a separator between the positive and negative electrodes.

The lithium-ion secondary battery according to the embodiment may be any type and may include two materials selected from materials available to form electrodes, one of which has a noble potential for the positive electrode and the other of which has a potential less noble for the negative electrode.

The separator may be any known separator available for lithium-ion secondary batteries.

EXAMPLES

Hereinafter, examples of the present invention will be described, which are not intended to limit the present invention.

Dielectric Particles

Dielectric particles were purchased from Toshima Manufacturing Co., Ltd. When necessary, the dielectric particles were pulverized with isopropyl alcohol (IPA) using a ball mill to give dielectric particles with an adjusted median diameter.

Table 1 shows the properties of the dielectric particles.

TABLE 1

| | Abbreviation | Relative permittivity/— | $D_{50}/\mu m$ |
|---|---|---|---|
| $KNbO_3$ | KNO | 40 | 0.6 |
| $Li_{0.33}La_{0.55}TiO_3$ | LLT | 23 | 0.4 |
| $LiNbO_3$ | LNO | 38 | 0.6 |
| $BaZr_{0.2}Ti_{0.8}O_3$ | BZTO | 42 | 0.6 |

Method for Measuring Relative Permittivity of Powder

The powder was placed in a 38 mm diameter (R) tablet molding machine for measurement, and then compressed to a thickness (d) of 1 to 2 mm using a hydraulic press machine to give a compressed powder. The compressed powder was formed under such conditions as to achieve a powder relative density of 40% or more, which was calculated according to the formula: powder relative density ($D_{powder}$) =(the weight density of the compressed powder/the true specific gravity of the powder)×100. The compressed powder was then measured for capacitance $C_{total}$ at 25° C. and 1 kHz by automatic balancing bridge method using an LCR meter, and the relative permittivity $\varepsilon_{total}$ of the compressed powder was calculated from the measurement. The relative permittivity $\varepsilon_{powder}$ of the powder (solid volume part) was then calculated from the resulting relative permittivity of the compressed powder using Formulas (1) to (3) below, in which $\varepsilon_0$ is the permittivity of vacuum (=8.854×10$^{-12}$) and $\varepsilon_{air}$ is the relative permittivity of air (=1).

The contact area $A$ between the compressed powder and the electrode=$(R/2)^2 \times \pi$    (1)

$C_{total} = \varepsilon_{total} \times \varepsilon_0 \times (A/d)$    (2)

$\varepsilon_{total} = \varepsilon_{powder} \times D_{powder}, \varepsilon_{air} \times (1 - D_{powder})$    (3)

Method for Measuring Median Diameter ($D_{50}$)

The particle size distribution of the powder was measured using a particle size distribution analyzer MT3000II (manufactured by Microtrac). In the measurement, water was used as a solvent, the refractive index was set to 1.81, and the median diameter was defined as the particle size at which the cumulative percentage (%) reached 50.

Examples 1 to 5 and Comparative Examples 1 to 3

Preparation of Positive Electrode

The dielectric particles, acetylene black (AB) as a conductive aid, polyvinylidene fluoride (PVDF) as a binder, polyvinylpyrrolidone (PVP) as a dispersant, and N-methyl-2-pyrrolidone (NMP) as a dispersion medium were subjected to premixing and then wet mixing using a planetary centrifugal mixer to give a premix slurry. Subsequently, $LiNi_{0.8}Co_{0.1}Mn_{0.1}O_2$ (NCM811) as a positive electrode active material was mixed with the resulting premix slurry. The mixture was then subjected to a dispersion process using a planetary mixer to give a positive electrode material mixture paste. Table 2 shows the mass content of each component in the NCM811 positive electrode material mixture paste. When having a bimodal particle size distribution, NCM811 has peak particle sizes of 4 μm and 14 μm. When having no bimodal particle size distribution, MCM811 has a peak particle size of 12 μm.

The positive electrode material mixture paste was applied to an aluminum foil as a positive electrode current collector and then dried. Subsequently, the dried material on the positive electrode current collector was pressed using a roll press and then dried in vacuo at 120° C. to form a positive electrode material mixture layer, so that a positive electrode plate was obtained. The resulting positive electrode plate was punched into a size of 30 mm×40 mm so that a positive electrode was obtained.

Preparation of Negative Electrode

An aqueous solution of carboxymethyl cellulose (CMC) as a binder and acetylene black (AB) as a conductive aid were premixed using a planetary mixer. Subsequently, natural graphite (NG) as a negative electrode active material was added to the mixture and then premixed using a planetary mixer. Subsequently, water as a dispersion medium and styrene butadiene rubber (SBR) as a binder were added to the mixture, which was subjected to a dispersion process using a planetary mixer to give a negative electrode material mixture paste. The negative electrode material mixture paste had a mass composition ratio of NG, AB, CMC, and SBR of 97.5:0.5:1.0:1.0. NG had a median diameter of 12 μm. The negative electrode material mixture paste was then applied to a copper foil as a negative electrode current collector and then dried. Subsequently, the dried material on the negative electrode current collector was pressed using a roll press, and then dried in vacuo at 130° C. to give a negative electrode material mixture layer, so that a negative electrode plate was obtained. The resulting negative electrode plate was punched into a size of 32 mm×42 mm so that a negative electrode was obtained.

Preparation of Lithium-Ion Secondary Battery

An aluminum laminate (manufactured by Dai Nippon Printing Co., Ltd.) for a secondary battery was heat-sealed to form a bag-shaped case. A separator was placed between the positive and negative electrodes. The resulting laminate was placed in the case, and then an electrolytic solution was injected into the interface between the electrodes. The case was then sealed at a reduced pressure of 95 kPa so that a lithium-ion secondary battery was obtained. The separator was a polyethylene microporous membrane with its one side coated with alumina particles with a thickness of about 5 μm. The electrolytic solution was a solution of 1.2 mol/L $LiPF_6$ as an electrolyte salt in a mixed solvent of ethylene carbonate, ethyl methyl carbonate, and dimethyl carbonate in a volume ratio of 30:30:40.

Pore Diameter Distribution of Positive Electrode

The positive electrode was pretreated by drying in vacuo at 120° C. for 12 hours. Subsequently, the pore diameter distribution of the positive electrode was measured by mercury intrusion technique using AutoPore V 9605 (manufactured by Micromeritics). The measured pore diameters were in the range of about 0.0036 to 200 μm. The diameter of pores in the positive electrode was calculated using the Washburn equation:

$P \times D = -4 \times \sigma \times \cos \theta$

P: pressure, σ: surface tension of mercury, D: pore diameter,

θ: contact angle of mercury on positive electrode

The surface tension of mercury is 480 dynes/cm, and the contact angle of mercury on the positive electrode is 140°.

Figure 1:
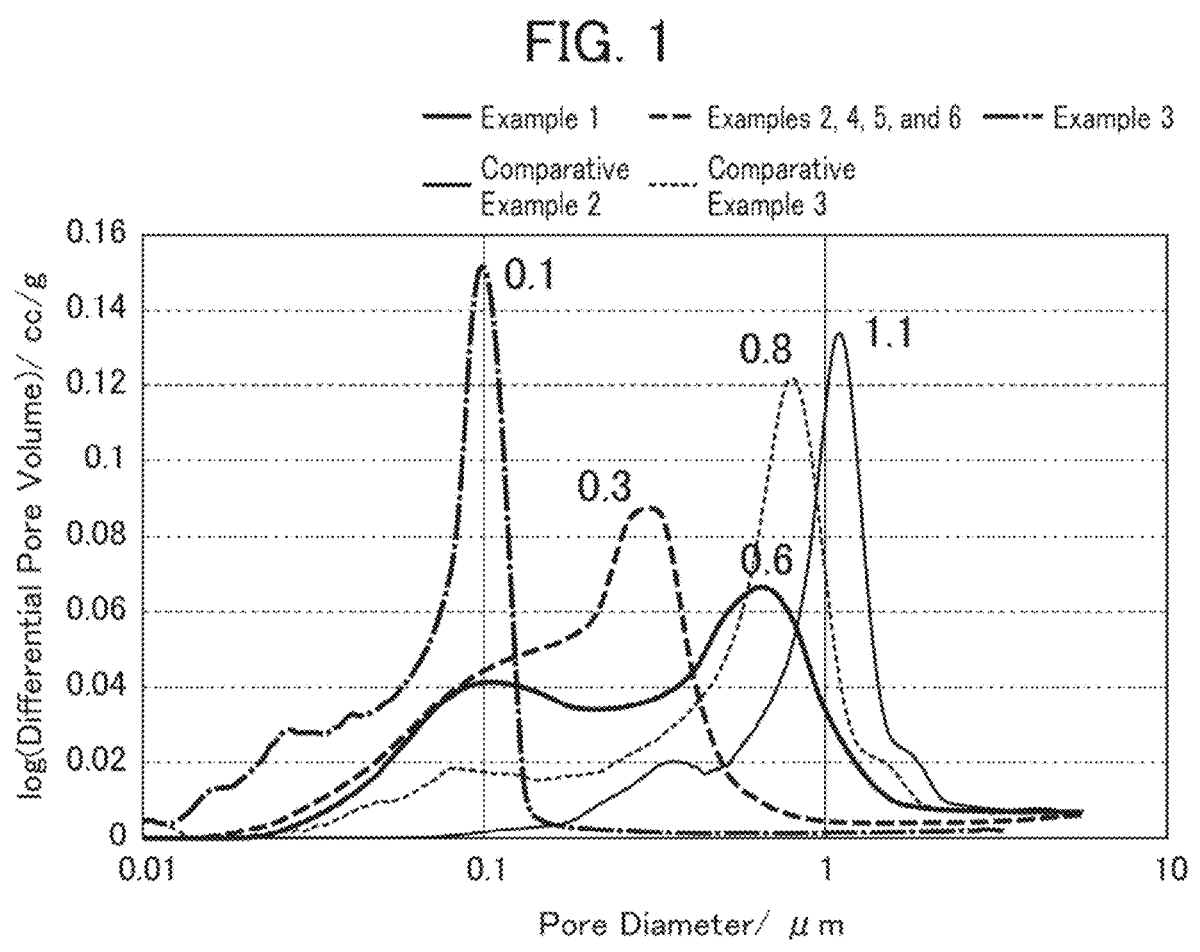

FIG. 1 shows the results of the measurement of the pore diameter distribution of the positive electrode of each of Examples 1 to 5 and Comparative Examples 1 to 3. FIG. 1 also shows the peak pore diameter value of each positive electrode.

7

Observation of Cross-Section of Positive Electrode

An SEM was used to observe a cross-section of the positive electrode of each of Example 1 and Comparative Example 1.

Figure 3:
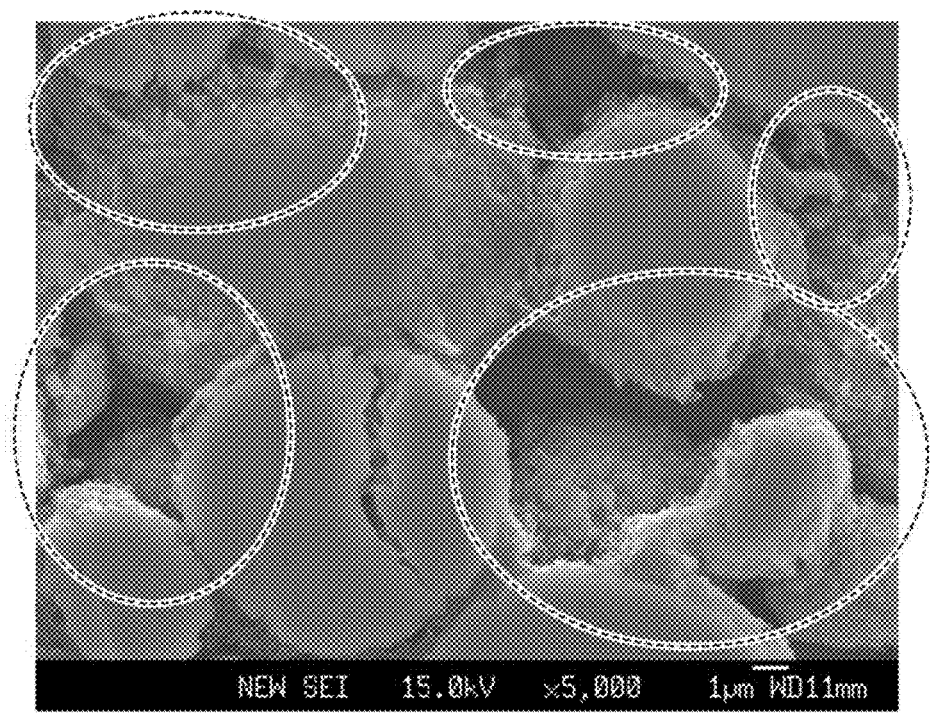
FIG. 3 is an SEM photograph of a cross-section of the positive electrode of Comparative Example 1.

FIG. 2 is an SEM photograph showing a cross-section of the positive electrode of Example 1. FIG. 3 is an SEM photograph showing a cross-section of the positive electrode of Comparative Example 1.

FIGS. 2 and 3 indicate that the number of spaces (portions enclosed by the dotted lines) is smaller in the positive electrode of Example 1 than in the positive electrode of Comparative Example 1. This shows that the rate of contact between the dielectric particles and an electrolytic solution will be higher in the positive electrode of Example 1.

Evaluation of Initial Performance of Lithium-Ion Secondary Battery

The lithium-ion secondary battery of each of Examples 1 to 5 and Comparative Examples 1 to 3 was evaluated for initial performance as shown below.

Discharge Capacity

The prepared lithium-ion secondary battery was allowed to stand at a measurement temperature (25° C.) for 1 hour, then charged at a constant current of 12.4 mA until 4.2 V was reached, and subsequently charged at a constant voltage of 4.2 V for 1 hour. Subsequently, the lithium-ion secondary battery was allowed to stand for 30 minutes, and then discharged at a constant current of 12.4 mA until 2.5 V was reached. The process was repeated 5 times, in which the discharge capacity (mAh) at the fifth discharge was determined. The current value at which the discharge was completed in 1 hour was normalized to 1 C with respect to the resulting discharge capacity.

Cell Resistance

After the measurement of the discharge capacity, the lithium-ion secondary battery was allowed to stand at a measurement temperature (25° C.) for 1 hour, then charged at a constant current and a charge rate of 0.2 C such that the charge level (state of charge (SOC)) was adjusted to 50%, and then allowed to stand for 10 minutes. Subsequently, the lithium-ion secondary battery was pulse-discharged at a discharge rate of 0.5 C for 10 seconds, during which the voltage was measured. The current value was plotted on the horizontal axis, and the 10 second-discharge voltage for the discharge rate of 0.5 C was plotted on the vertical axis. Next, after being allowed to stand for 10 minutes, the lithium-ion secondary battery was supplementarily charged until SOC returned to 50%, and then allowed to stand for 10 minutes. The operation shown above was performed at each of the discharge rates 1.0 C, 1.5 C, 2.0 C, 2.5 C, and 3.0 C, and the 10 second-discharge voltage was plotted for each discharge rate. The cell resistance (mΩ) was then defined as the slope of an approximate straight line obtained from the plots by least squares method.

Evaluation of Performance of Lithium-Ion Secondary Battery after Endurance Test

The lithium-ion secondary battery of each of Examples 1 to 5 and Comparative Examples 1 to 3 was evaluated for performance after an endurance test as shown below.

Discharge Capacity

In a thermostatic chamber at 45° C., the lithium-ion secondary battery was subjected to 500 cycles of constant-current charging to 4.2 V at a charge rate of 1 C and then constant-current discharging to 2.5 V at a discharge rate of 2 C. The lithium-ion secondary battery was then allowed to stand for 24 hours in the thermostatic chamber with the temperature changed to 25° C. The lithium-ion secondary battery was then charged at a constant current and a charge rate of 0.2 C until 4.2 V was reached, and subsequently charged at a constant voltage of 4.2 V for 1 hour. Subsequently, the lithium-ion secondary battery was allowed to stand for 30 minutes, then discharged at a discharge rate of 0.2 C until 2.5 V was reached, and then measured for discharge capacity (mAh).

Cell Resistance

After the measurement of the discharge capacity, the lithium-ion secondary battery was charged such that the charge level (state of charge (SOC)) was adjusted to 50%, and then the cell resistance (mΩ) was determined as in the measurement of the initial performance.

Capacity Retention

The capacity retention (%) was defined as the percentage ratio of the discharge capacity after the endurance test to the initial discharge capacity.

Rate of Change in Resistance

The rate (%) of change in resistance was defined as the percentage ratio of the cell resistance after the endurance test to the initial ceil resistance.

Table 2 shows the results of evaluation of the initial performance of the lithium-ion secondary battery and the results of evaluation of the performance of the lithium-ion secondary battery after the endurance test.

TABLE 2

| | | Example | | | | | Comparative Example | | |
|---|---|---|---|---|---|---|---|---|---|
| | | 1 | 2 | 3 | 4 | 5 | 1 | 2 | 3 |
| Positive electrode material mixture layer | NCM811 | 95.2 | 95.2 | 95.2 | 96.1 | 94.2 | 96.2 | 95.2 | 95.2 |
| | AB | 2.6 | 2.6 | 2.6 | 2.6 | 2.6 | 2.6 | 2.6 | 2.6 |
| | PVDF | 1.1 | 1.1 | 1.1 | 1.1 | 1.1 | 1.1 | 1.1 | 1.1 |
| | PVP | 0.1 | 0.1 | 0.1 | 0.1 | 0.1 | 0.1 | 0.1 | 0.1 |
| | Dielectric particles | 1 | 1 | 1 | 0.1 | 2 | 0 | 1 | 1 |
| NCM811 | Bimodal particle size distribution | Present | Present | Present | Present | Present | Absent | Absent | Present |
| Dielectric particles | Abbreviation | BZTO | BZTO | KNO | BZTO | LLT | — | KNO | KNO |
| | Relative permittivity/— | 42 | 42 | 40 | 42 | 23 | — | 40 | 40 |
| | $D_{50}$/μm | 0.6 | 0.6 | 0.4 | 0.6 | 0.4 | — | 0.4 | 04 |
| Positive electrode | Peak pore diameter/μm | 0.6 | 0.3 | 0.1 | 0.3 | 0.3 | 1.1 | 1.1 | 0.8 |
| | Density/g/cc | 3.4 | 3.5 | 3.6 | 3.5 | 3.5 | 3.4 | 3.4 | 34 |

TABLE 2-continued

| | | Example | | | | | Comparative Example | | |
|---|---|---|---|---|---|---|---|---|---|
| | | 1 | 2 | 3 | 4 | 5 | 1 | 2 | 3 |
| Initial performance | Discharge capacity[mAh] | 61.4 | 61.4 | 61.4 | 61.9 | 60.7 | 61.1 | 61.4 | 61.4 |
| | Cell resistance [mΩ] | 998 | 985 | 1004 | 991 | 998 | 1138 | 1042 | 1024 |
| Performance after endurance test | Discharge capacity [mAh] | 53.4 | 54.0 | 54.6 | 53.9 | 52.8 | 48.9 | 51.2 | 52.2 |
| | Cell resistance[Ω] | 1417 | 1369 | 1406 | 1437 | 1437 | 2563 | 1899 | 1577 |
| | Capacity retention [%] | 87.0 | 88.0 | 89.0 | 87.0 | 87.0 | 80.1 | 83.5 | 85.0 |
| | Rate of change in resistance [%] | 142 | 139 | 140 | 145 | 144 | 225 | 182 | 154 |

Table 2 shows that the lithium-ion secondary batteries of Examples 1 to 5 have low cell resistance and high durability.

The lithium-ion secondary battery of Comparative Example 1 with the positive electrode material mixture layer containing no dielectric particles has high cell resistance and low durability. The lithium-ion secondary batteries of Comparative Examples 2 and 3, in which the peak pore diameter of the positive electrode is larger than the median diameter of the dielectric particles, have nigh cell resistance and low durability.

What is claimed is:

1. A lithium-ion secondary battery, comprising:
a positive electrode;
a negative electrode; and
a separator between the positive electrode and the negative electrode,
the positive electrode comprising: a positive electrode current collector; and a positive electrode material mixture layer,
the positive electrode material mixture layer comprising a positive electrode active material and dielectric particles, the positive electrode active material has a bimodal particle size distribution,
the dielectric particles comprising $BaZr_{0.2}Ti_{0.8}O_3$, $KNbO_3$, or $Li_{0.33}La_{0.55}TiO_3$,
the positive electrode having a peak pore diameter of 0.1 μm or more and 0.6 μm or less, the peak pore diameter being smaller than or equal to a median diameter of the dielectric particles.

2. The lithium-ion secondary battery according to claim 1, wherein the positive electrode material mixture layer contains 0.1% by mass or more and 2% by mass or less of the dielectric particles.

3. The lithium-ion secondary battery according to claim 1, wherein the dielectric particles have a relative permittivity of 20 or more.

4. The lithium-ion secondary battery according to claim 1, wherein the positive electrode has a density of 3.4 g/cc or more.

5. The lithium-ion secondary battery according to claim 1, further comprising: an electrolytic solution.

* * * * *